Jan. 30, 1934.                E. SILBERMANN ET AL                1,945,088
                           FLUID PRESSURE ROTARY ENGINE
                              Filed Nov. 19, 1929
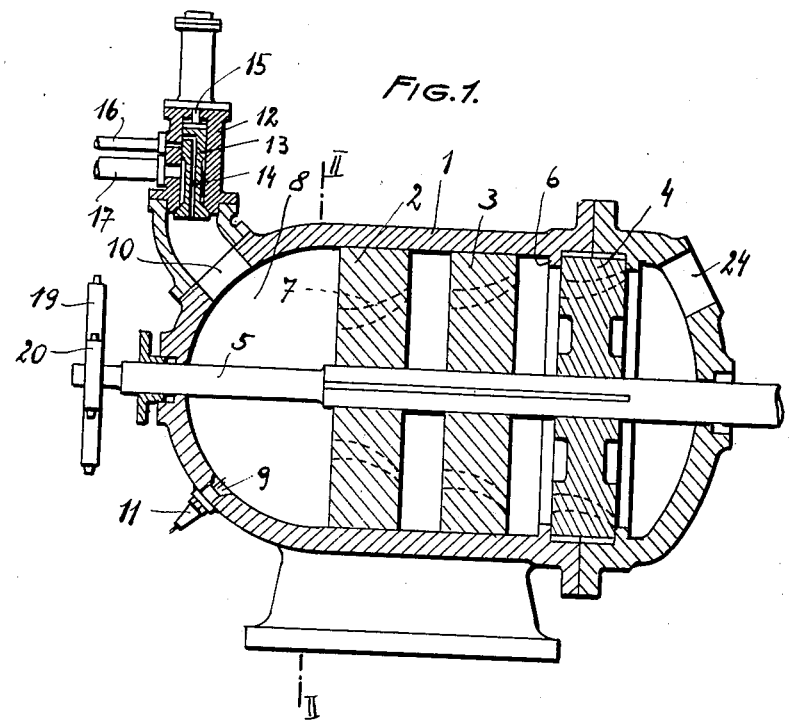
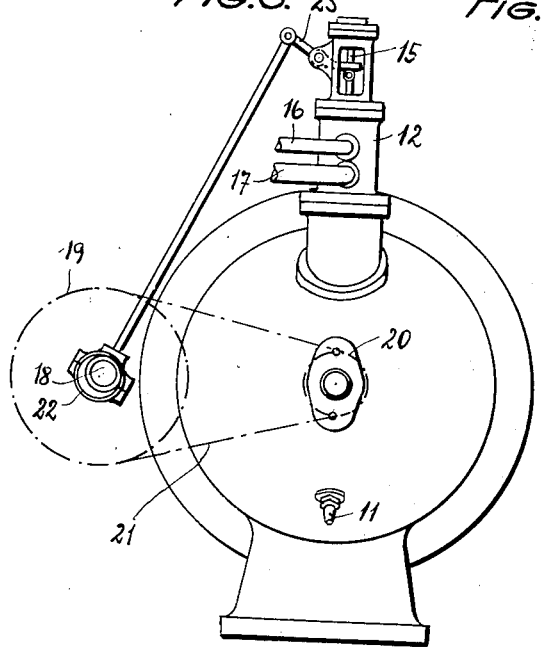
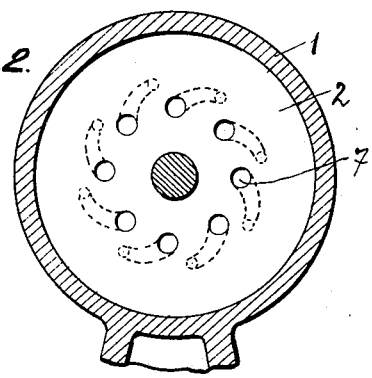
INVENTORS:
EUGEN SILBERMANN
JULIUS STOLCZ
BY Ruege & Boyne
ATTORNEYS Patented Jan. 30, 1934

1,945,088

UNITED STATES PATENT OFFICE 1,945,088

FLUID PRESSURE ROTARY ENGINE

Eugen Silbermann and Julius Stolcz, Oradeamare, Rumania, assignors, by direct and mesne assignments, to Explorotor A. G., Glarus, Switzerland, a corporation of Switzerland Application November 19, 1929, Serial No. 408,199, and in Austria November 28, 1928

1 Claim. (Cl. 253—91)

This invention relates to a turbine the rotor of which is provided with channels or ducts for the passage of the motive fluid, and consists essentially in that the main line of flow of each channel is a continuous three dimensional curve, and that the entry and exit ends of the channels are disposed in the direction of these curves. This arrangement of the channels enables channels of great length to be employed in compact formation on the rotor, with the further result that in addition to the kinetic energy the potential energy of the motive fluid is also extensively utilized. This is particularly true of such cases in which the flow of the motive fluid into the channels is not continuous but periodic. In such cases the motive fluid on entering the empty channel, presumably exerts an active thrust or impact, then has its potential energy transformed through approximately isothermal expansion into effective work, and finally on leaving the channel exerts a reaction thrust.

The shape of the channels in accordance with the invention is, however, also of value in connection with continuous flow turbines, since the shape of channel with which the friction of the motive fluid against the walling of the channel is least, is that of a three dimensional curve. The path of each particle of the motive fluid follows a helix of constant or variable diameter. Although in practice the curvature of the channels cannot always coincide precisely with a portion of a helix, yet in fact continuous three dimensional curves, which characterize the invention, approach most nearly to a helical curve, and thus reduce the injurious friction on the sides of the ducts to a minimum.

With our invention the advantage of direct rotor propulsion is combined with comparatively high efficiency and very light weight, rendering the invention particularly valuable for aircraft engines, aerial torpedoes and other projectiles, as well as for stationary and automobile engines.

The invention is diagrammatically illustrated in the annexed drawing, wherein

Fig. 1 is a central longitudinal sectional view of a rotary engine embodying the features of the present invention;

Fig. 2 is a transverse sectional view taken approximately on the line II—II of Fig. 1;

Fig. 3 is an end view of the engine shown in Fig. 1; and

Figs. 4 and 5 are diagrammatic cross-sectional views illustrating two modifications in the form of the fuel channels in the rotors of the engine, the arrows indicating the direction of rotation of the rotors.

Referring first to Figs. 1 and 2, the cylindrical casing 1 contains rotors 2, 3 and 4 fixed to a common shaft 5. It will be understood that there may be more or less than three rotors, and in some cases only a single rotor. Fluid tight joints at the peripheries of the rotors may be produced in the usual way by means of packing rings, or the casing may be provided with ribs 6 as shown in connection with rotor 4, the latter method having the advantages of durability and low friction.

The rotors have passages or ducts 7, extending therethrough from one side to the other. The ducts are disposed in a circle about the axis of the shaft, as shown in Fig. 2. The tangents of the central axis of each duct 7 lie along the surface of a regular rotatable figure, and the tangents taken at corresponding points of all the said axes may likewise be along a similar surface. Preferably the axes constitute a system of curves, whose tangents are on the surface of an hyperboloid or similar solid. The angles contained by the tangents and the rotor surfaces at the inlets and outlets of the ducts depend on the entering and issuing velocities of the fluid. The cross section of the ducts decreases towards the outlets, and is such that in regard to the direction of rotation of the rotor, there is more concave surface area than convex surface area, with a view to obtaining the maximum action of the fluid. This tapering effects a damming of the motive fluid, so that the greater part of the potential energy is transformed into effective work.

As shown herein, a chamber 8 is formed between the wall of the casing 1 and the rotor 2, openings 9 and 10 being provided in said wall, which openings may be used for the accommodation respectively of a suitable ignition device, such for instance as a spark plug 11, and a housing 12 for a fuel-admission valve 13. Both of these members are well known in the art and are shown herein merely for the purpose of illustrating a complete, operative device. As shown, the valve 13 is provided with a longitudinal bore 14 which communicates by means of radial openings in the valve and its housing, with a fuel-supply pipe 16, a peripheral clearance in the valve stem being adapted to communicate through a second radial opening in the housing 12, with an air-inlet pipe 17. The valve is further provided with a rod 15 by which it is operated by means of a two-armed lever which is eccentrically connected, as at 22, to a shaft 18, on one end of which is secured a sprocket wheel 19 which is connected by a chain 21 to a sprocket wheel 20 secured on one end of the rotor shaft 5. The housing may be provided with an opening 24 for exhausting the burned gases or other products of combustion. As above stated, these details are not of the essence of the invention and may be considerably modified without departing therefrom.

The channels 7 may be of various cross-sectional forms, two of which are indicated in Figs. 4 and 5. In these figures the arrows are intended to indicate the direction of rotation of the rotors, and it will be noted that in all cases the width of the channels is greater at the side thereof which is foremost to the direction of rotation. This arrangement reduces to a minimum the ratio between the counteractive portion of the surface of the channels, that is to say, the portion or portions of said surface which are acted upon by the components of the thrust of the motive fluid opposed to the direction of rotation, and the active portions of said surface.

The gases flowing through the ducts exert pressure on the walls thereof, exerting pressures which cooperate for rotating the shaft. The fuel may be petrol or heavy oil, but we may also use ammonium nitrite, chlorates, naphthalin, picrates and so on. It will be noted that the engine has no guide vanes. The fluid proceeding from the explosion chamber simultaneously enters the duct in each rotor, operating from the centre in all directions.

What we claim is:

In a fluid pressure rotary engine, a rotor provided with reaction channels for the driving medium, the cross-sectional area of said channels being enlarged at that side thereof which is foremost with relation to the direction of rotation of the rotor.

EUGEN SILBERMANN.
JULIUS STOLCZ.